Jan. 5, 1937.  J. E. FOGARTY  2,066,397
DISPENSING APPARATUS
Filed June 21, 1935
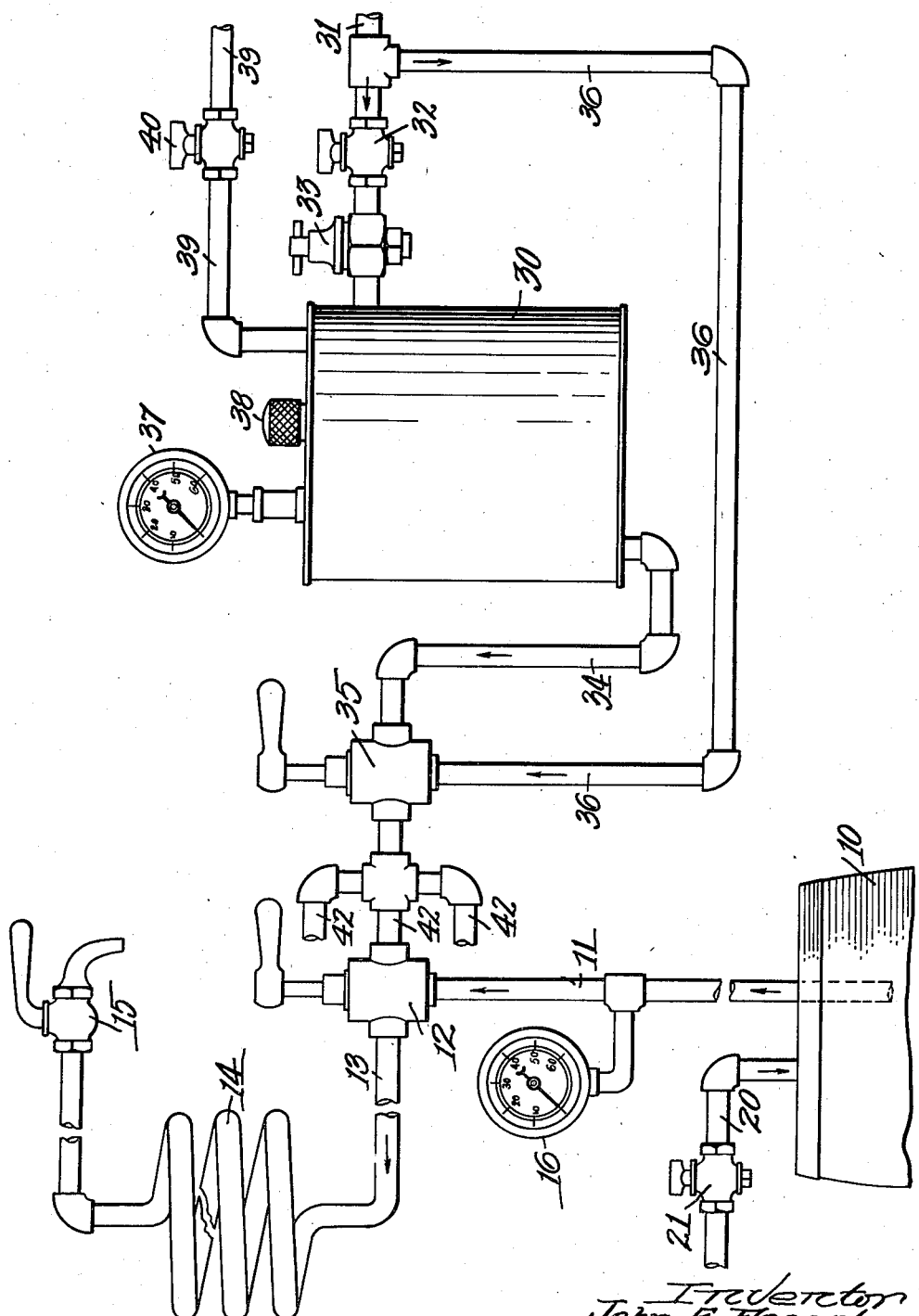
Inventor
John E. Fogarty.
By attorneys
Southgate Fay & Hawley Patented Jan. 5, 1937

2,066,397

UNITED STATES PATENT OFFICE 2,066,397

DISPENSING APPARATUS

John Edward Fogarty, Auburn, Mass.

Application June 21, 1935, Serial No. 27,631

4 Claims. (Cl. 225—12)

This invention relates to apparatus for dispensing beer or other beverages.

It is the general object of my invention to provide improved means for delivering beer at a dispensing point at a carefully regulated pressure, and for clearing and cleaning the dispensing apparatus when desired.

My invention further relates to arrangements and combinations of parts which will be hereinafter described and more particularly pointed out in the appended claims.

A preferred form of the invention is shown in the drawing which is a front elevation of my improved dispensing apparatus.

Referring to the drawing, I have shown a barrel or other closed container 10 connected by a feed pipe 11 to a three-way valve 12. A distributing pipe 13 connects the valve 12 through a cooling coil 14 to a spigot or tap 15 from which the beer or other beverage is drawn and served.

A pressure gauge 16 is preferably connected into the pipe 11 between the barrel 10 and the three-way valve 12, so that the gauge at all times will show the pressure in the barrel 10 and feed pipe 11.

A pressure pipe 20 is also connected into the closed barrel 10 and is provided with a shut-off valve 21. When the valve is open, air or carbonic acid gas under pressure will flow into the barrel 10 and will force the beer or other beverage out through the pipe 11.

I also provide a tank 30 to which a water main 31 is connected through a shut-off valve 32 and a reducing valve 33. The tank 30 is also connected through a pipe 34 to a three-way valve 35, to which a by-pass 36 from the water main is also connected.

The usual city-service pressure will be maintained in the pipe 31 and by-pass 36, while a reduced and regulated pressure, commonly about ten pounds, will be maintained in the tank 30 and pipe 34 by the reducing valve 33.

A gauge 37 is provided to show the pressure in the tank 30, and a plug 38 is also provided, which plug may be removed when it is desired to fill the tank 30 with a cleaning solution, as will be hereinafter described. An air pressure pipe 39 is also connected into the tank 30 and is provided with a shut-off valve 40. When the valve 40 is closed and the plug 38 is in place, the tank 30 is air-tight.

If water is then admitted through the reducing valve 33, the air in the tank will be compressed to the pressure for which the reducing valve is set, which pressure will be registered on the gauge 37. The tank 30 will thus be partially filled with water at the regulated pressure, the remainder of the tank being filled with air at the same pressure.

The three-way valve 35 is connected to a plurality of branch pipes 42, one of which is connected to the three-way valve 12 previously described, while the others are similarly connected to other three-way valves not shown, these latter valves being parts of additional distributing systems.

Having described the construction of my improved dispensing apparatus, I will now describe the operation and advantages thereof.

Under normal conditions, the three-way valve 35 is set to connect the pipe 34 with the branch pipes 42, and to close the high pressure by-pass 36. During the ordinary dispensing of the beverage, the three-way valve 12 is set to close the branch pipe 42 and to connect the feed pipe 11 with the distributing pipe 13. The beer or other beverage is then forced out of the barrel 10 by the air or gas pressure in the pipe 20 which thus maintains a desired moderate pressure on the liquid in the system and at the tap 15.

It is found that beer left standing over night in the distributing pipe 13 and cooling coil 14 becomes stagnant or acquires a metallic taste, so that ordinarily when operations are resumed, the beer in the pipe and distributing coil must be drained out and thrown away.

With my improved apparatus, the attendant will turn the handle of the three-way valve 12 when sales for the day are about concluded and will thus connect the branch pipe 42 with the distributing pipe 13 and close the feed pipe 11.

Water under the regulated pressure of the tank 30 will then force the beer out of the tap 15 whenever the tap is opened, and in this way the pipe 13 and coil 14 may be emptied of beer and filled with water which will be left in these parts until selling operations are resumed.

The valve 12 is then returned to its original setting, and beer entering the valve 12 under pressure through the feed pipe 11 will force the water out of the tap 15 and will again fill the pipe 13 and coil 14 with beer.

I thus avoid the waste of beer caused by leaving the same in the distributing pipe and cooling coil over night. It will be understood that a similar three-way valve 12 and similar dispensing apparatus is provided for each of the branch pipes 42. The storage of a considerable volume of water under air pressure in the tank 30 provides a much larger available supply of water under regulated pressure than could be taken direct from the reducing valve 33.

It is sometimes desirable to force water under high pressure through the distributing pipe and cooling coil to thoroughly clear the same. When this is desired, the three-way valve 35 is shifted to connect the by-pass 36 to the branch pipes 42 and through the valves 12 to the pipes 13 and coils 14, in which way high pressure water from the water main is made available for clearing purposes.

It is also at times desirable to thoroughly clean the pipes and coil with a soda or other cleaning solution. To accomplish this result, I close the shut-off valve 32 and remove the plug 38, introduce the desired cleaning solution into the tank 30, re-insert the plug 38, open the air valve 40, and set the valves 12 and 35 so that the compressed air will force the cleaning solution through the pipe 34, valve 35, branch pipe 42 and valve 12 to the distributing pipe 13 and coil 14, thus thoroughly cleaning the apparatus. The parts may thereafter be rinsed by introduction of water under high pressure as previously described.

In the dispensing of beer it is frequently found that through agitation or otherwise, the beer in a newly tapped barrel will be under excessive pressure, a condition commonly termed "heady". It is very difficult to dispense beer in this condition and it is common to draw off and waste a considerable amount of beer in order to reduce the pressure to a desired amount. With my improved apparatus, this waste of beer is avoided by proceeding in the following manner:

As soon as a new barrel is connected, the gauge 16 will disclose any condition of excessive pressure in the barrel. Assuming this to be the case, the valve 12 is set to connect the pipe 11 with the pipe 13, and the tap 15 is opened slightly, thus allowing the beer to gradually force out the water in the pipe 13 and coil 14.

When the water is all forced out, the valve 12 is reversed to close the pipe 11 and connect the pipe 42 with the pipe 13, after which the beer in the pipe 13 and coil 14 may be dispensed under the regulated pressure in the tank 30, the procedure being the same as at closing time.

When the pipe 13 and coil 14 is emptied of beer and again filled with water, the valve 12 is shifted to connect the pipe 11 with the pipe 13 and the beer under excessive pressure is again allowed to displace the water in the pipe and coil as before. This procedure is repeated until the gauge 16 shows that enough beer has been withdrawn to lower the pressure in the barrel 10 to the pressure maintained in the air or gas line 20.

I am thus able to draw off without waste the necessary amount of beer from a barrel showing excessive pressure, and to dispense the beer at the usual regulated pressure.

Having thus described the uses and utility of my apparatus, it will be evident that the apparatus while simple in construction is capable of several extremely desirable uses in connection with the dispensing of beer or other beverages. When the apparatus is installed for use, it will be understood that the valves 12 and 35 are positioned for convenient operation by the attendant and that the gauges 16 and 37 are also conveniently located for his inspection.

Having thus described my invention and the advantages thereof, I do not wish to be limited to the details herein disclosed, otherwise than as set forth in the claims, but what I claim is:—

1. Dispensing apparatus comprising a three-way valve, a beverage feed pipe and a beverage distributing pipe connected thereto, an additional pipe connected to said valve, a high pressure water main, and means to maintain a regulated water pressure in said additional pipe substantially less than water main pressure and substantially equal to the normal dispensing pressure of the beverage being dispensed, said three-way valve being effective to connect either the feed pipe or the additional pipe to said distributing pipe and to simultaneously shut off the other one of said two pipes.

2. Dispensing apparatus comprising a three-way valve, a beverage feed pipe and a beverage distributing pipe connected thereto, an additional pipe connected to said valve, a high pressure water main, and a pressure reducing and regulating connection between said water main and said three-way valve, said connection comprising a pressure tank connected to said water main and to said three-way valve, and a reducing valve between said water main and said tank by which the normal pressure in said tank is maintained substantially at the usual dispensing pressure for the beverage being dispensed and substantially less than the water main pressure, and said three-way valve being effective to connect either the feed pipe or the pressure tank to said distributing pipe and to simultaneously shut off the other connection.

3. Dispensing apparatus comprising a three-way valve, a beverage feed pipe and a beverage distributing pipe connected thereto, an additional pipe connected to said valve, and means to maintain a regulated water pressure in said additional pipe substantially equal to the usual dispensing pressure for the beverage being dispensed, said three-way valve being effective to connect either the feed pipe or the additional pipe to said distributing pipe and to simultaneously shut off the other one of said two pipes, and said pressure regulating means comprising a pressure tank, a connection from a high pressure water main to said tank, with a shut-off valve and a reducing valve in said connection, a pressure gauge for said tank, an air pressure pipe connected to said tank and provided with a shut-off valve, and a removable air-tight closure device for said tank.

4. Dispensing apparatus comprising a three-way valve, a beverage feed pipe and a beverage distributing pipe connected thereto, an additional pipe connected to said valve, and means to maintain a regulated water pressure in said additional pipe, said three-way valve being effective to connect either the feed pipe or the additional pipe, said three-way valve being effective to simultaneously shut off the other one of said two pipes, and said pressure regulating means comprising a pressure tank, a connection from a water main to said tank, with a shut-off valve and a reducing valve in said connection, a second three-way valve in said additional pipe, and a by-pass connection from said water main to said latter valve, whereby water at regulated pressure or high pressure water may be selectively supplied to said additional pipe and to said first-mentioned three-way valve.

JOHN EDWARD FOGARTY.